UNITED STATES PATENT OFFICE 2,558,528

PROCESS OF PRODUCING A REDUCING SUGAR AND MILK PRODUCT

Paul F. Sharp, Piedmont, Calif., assignor to Golden State Company, Ltd., San Francisco, Calif., a corporation of Delaware No Drawing. Application January 29, 1945, Serial No. 575,179

7 Claims. (Cl. 99—55)

This invention relates to a new and improved food ingredient and to a method of making the same. More particularly it relates to a combination product including milk solids and reducing sugars so combined and treated as to become a beneficial ingredient in bread, ice cream or similar products.

Many food products include as constituents milk or dried milk and corn syrup or similar sugars. It has been found that a preliminary joint heat treatment of the milk and sugar has a definite beneficial effect on the resultant food product. For example, if a few percent of milk concentrate and a few percent of corn syrup solids are jointly heat treated according to the present invention prior to being added to bread dough, the resulting loaf is larger and better than that obtained by merely adding the ingredients to the dough without prior joint treatment. The milk concentrate may comprise skim milk with fats substantially eliminated or it may contain varying proportions of milk fat, depending upon the materials available and the use to which the product is to be put. The beneficial effects of my process resides, however, in the treatment of milk solids other than fat.

Mixing the milk concentrate and the corn syrup solids prior to incorporation in the dough is not in itself effective, but the desired effect is obtained only by subjecting the mixture to proper heat treatment before adding it to the dough. In other words, a very definite additional benefit is obtained by the use of the heat treated combined product over that obtained by adding the ingredients directly to the dough or by heating the skim milk concentrate alone and the corn syrup solids or other reducing sugar solids alone, and after such heating, adding them to the dough.

The beneficial effects are very similar in general characteristics when this combined and treated product is made an ingredient of ice cream. For example, the ice cream mixture often contains considerable amounts of dried milk or milk concentrate and corn syrup solids. The milk constituents for such use may comprise whole milk or may include fats in excess of those present in whole milk. If the milk concentrate and corn syrup solids are previously heated together before adding to the ice cream mixture, the body of the ice cream is much superior to that obtained by adding an equivalent amount of normal milk solids and normal corn syrup solids, or of milk solids heated alone and of corn syrup solids heated alone.

It is an object of the present invention to provide a new and improved food ingredient.

It is a further object to provide an ingredient which added to dough for making bread, doughnuts or the like, increases the size and quality of the food product.

It is an additional object to provide an ingredient of this character which comprises only constituents normally used in the final food product.

It is also an object to provide an ingredient which has beneficial effects when added to ice cream mixes or the like as well as to bread mixes or doughs or the like.

Other and further objects will appear as the description proceeds.

The product showing the desirable characteristics above mentioned can be produced by heating mixtures of milk concentrate and corn syrup solids in varying proportions. Most of the product has been produced on the basis of 50% milk solids other than fat and 50% corn syrup solids on a dry weight basis. This proportion was selected for convenience in calculating formulas particularly in ice cream and bread making. Very satisfactory products have been produced, however, by departing to a considerable extent from these proportions even to the extent of incorporating only 5 or 10% of corn syrup solids with 90–95% milk solids; and in the other direction by incorporating 30% of milk solids with 70% of corn syrup solids. These proportions can be shifted further in the direction of increasing the proportion of reducing sugar solids and still obtain some additional beneficial effect from the milk solids. It is to be understood that the proportions refer to milk solids other than fat and there may, in addition, be a considerable proportion of fat present. For example, the product might comprise, on a dry basis, 50% of milk fat, 25% of milk solids other than fat and 25% of reducing sugar solids.

In preparing this product, milk concentrate and corn syrup solids are mixed to give a fluid product of convenient solids content of about 40% total solids; for example, comprising 20% milk solids other than fat and 20% corn syrup solids. This product is then heated to a temperature of 240° F. and held at this temperature for 2 to 3 minutes, after which it is cooled and used as a concentrate in food production or the concentrate after the heat treatment may be spray dried in the conventional manner. A preferred way of making this product is to pump the concentrate through a heater of steam injector type to heat the product, have the product flow through a heating pipe of sufficient length to maintain the product for example, at 240° F. for 2 minutes, and then cool the product. Partial cooling can be accomplished by permitting the steam to escape from the product as a result of passing through a restraining valve. The product thus cools to 212° F., the escaping steam being vented through a suitable trap. The hot mixture may then be fed directly to the atomizing device of spray drying equipment and the product is thus converted to a dried powder.

There are certain limits of operation. A very satisfactory guide which enables any one skilled in the art to control this operation has been found; namely, that the relationship between time and temperature should be such that the mixture is heated just short of undesirable browning. If, for example, instead of heating to 240° F. one desired to shorten the holding time, this can be done by increasing the temperature of heating. Under the new set of conditions, the temperature should be increased to a point just short of browning of the product, or after increasing the heating temperature until perceptible browning is encountered, the temperature should be reduced 5 to 15° F. below that producing browning. In this way, a satisfactory product has been produced by heating to 300° F. for ½ to 1 minute, and by heating at 230° F. for 2 to 5 minutes.

It is further to be noted that the temperature to which the mixed product should be heated is also a function of the solids content. For reasons of satisfactory operation of the process it is preferred to work with a total solids content in the neighborhood of 40% and in any event, not materially in excess of 48%. It has been found that there are difficulties with overheating. A modification of the solids content will be found to change the time required to brown the product and consequently change the permissible length of the heat treatment.

Experiments have indicated that other reducing sugars can satisfactorily take the place of corn syrup solids in this product; for example, glucose, maltose, levulose, have been used with satisfactory results. Suitable materials are syrups made by hydrolysis or degradation of polysaccharides or the like such for example as potato syrup or maltose syrup, or what are generally known as starch conversion syrups.

While certain preferred methods of carrying out the invention have been described, these are to be understood to be illustrative and I contemplate such modifications and variations as come within the spirit and scope of the appended claims.

I claim:

1. The method of preparing an edible material adapted for use in preparing food products such as baked products, ice cream and the like, and of improving the body and consistency thereof, which comprises combining a reducing sugar and the solids of milk into a liquid mixture and when the total solids content is in excess of 25% by weight heating the combination to a temperature in excess of 212° F. for a period short of browning of the product.

2. The method of preparing an edible material adapted for use in preparing food products such as baked products, ice cream and the like, and of improving the body and consistency thereof, which comprises combining a reducing sugar and the solids of milk into a liquid mixture and when the total solids content is in excess of 25% by weight heating the combination to a temperature in excess of 212° F. for a period short of browning of the product and thereafter converting the product to a dried powder.

3. The method of preparing an edible material adapted for use in preparing food products such as baked products, ice cream and the like, and of improving the body and consistency thereof, which comprises combining starch conversion product solids and the solids of milk into a liquid mixture and when the total solids content is in excess of 25% by weight heating the combination to a temperature in excess of 212° F. for a period short of browning of the product.

4. The method of preparing an edible material adapted for use in preparing food products such as baked products, ice cream and the like, and of improving the body and consistency thereof, which comprises combining a reducing sugar and the solids of milk into a liquid mixture and when the total solids content is in excess of 25% by weight heating the combination to a temperature of approximately 240° F. for a period of approximately 2 minutes.

5. The method of preparing an edible material adapted for use in preparing food products such as baked products, ice cream and the like, and of improving the body and consistency thereof, which comprises combining into a liquid mixture a reducing sugar and the solids other than fat of milk, wherein the milk solids other than fat comprise between 30% and 95% of the total solids exclusive of fat by dry weight, and the total solids content exclusive of fat is in excess of approximately 25% by weight, and heating the liquid mixture to a temperature within the range of from approximately 212° F. to approximately 300° F. for a period just short of browning the product.

6. The method of preparing an edible material adapted for use in preparing food products such as baked products, ice cream and the like, and of improving the body and consistency thereof, which comprises combining into a liquid mixture a reducing sugar and the solids other than fat of milk, wherein the milk solids other than fat and said reducing sugar are present in substantially equal quantities by dry weight, and wherein the total solids content exclusive of fat is in excess of approximately 25% by weight, heating the liquid mixture to a temperature of between approximately 230° F. and 300° F. for a period of approximately one-half minute to five minutes, said period being shortest for the highest temperature.

7. The method of preparing an edible material adapted for use in preparing food products such as baked products, ice cream and the like, and of improving the body and consistency thereof, which comprises combining into a liquid mixture the solids of a starch conversion product and the solids other than fat of milk, wherein the milk solids other than fat and said starch conversion product are present in substantially equal quantities by dry weight, and wherein the total solids content exclusive of fat is in excess of approximately 25% by weight, heating the liquid mixture to a temperature of between approximately 230° F. and 300° F. for a period of approximately one-half minute to five minutes, said period being shortest for the highest temperature.

PAUL F. SHARP.

REFERENCES CITED

The following references are of record in the file of this patent:

UNITED STATES PATENTS

| Number | Name | Date |
|---|---|---|
| 357,465 | Carnrick | Feb. 8, 1887 |
| 1,749,153 | O'Connor | Mar. 4, 1930 |
| 1,798,120 | Grindrod | Mar. 24, 1931 |
| 2,213,283 | Kronberg | Sept. 3, 1940 |
| 2,288,825 | Meyenberg | July 7, 1942 |
| 2,319,362 | Wouters | May 18, 1943 |

FOREIGN PATENTS

| Number | Country | Date |
|---|---|---|
| 394,182 | Great Britain | June 22, 1933 |